Aug. 14, 1945.  A. VANG  2,382,187

APPARATUS FOR TREATING GLASS

Filed Aug. 25, 1942

INVENTOR.
ALFRED VANG.
BY Peter G. Boesen
ATTORNEY.

Patented Aug. 14, 1945

2,382,187

UNITED STATES PATENT OFFICE 2,382,187

APPARATUS FOR TREATING GLASS

Alfred Vang, Summit, N. J., assignor of one-half to Stevenson, Jordan & Harrison, Inc., New York, N. Y., a corporation of New York Application August 25, 1942, Serial No. 455,981

4 Claims. (Cl. 49—39)

This invention relates to means for making glass under the influence of vibration. To eliminate many of the difficulties existing in the prior art and thereby obtain a glass of more homogeneous structure, greater ductility, greater strength, more uniform transparency and better transparency, as well as greater flexibility of the glass, I have found, that I can use vibratory power furnishing so-called supersonic vibrations or even vibrations in the audio range, to effect an orientation of the molecules of the glass, while it is still in its molten and fluid state and by means of said vibratory power to maintain the glass in this state until it is cooled. I have also found that by applying the proper frequency, as hereinafter described, it is possible to minimize tendencies to crystallize, as well as to obtain a certain stirring action by which the heavy particles and the light particles will be thoroughly mixed in a uniform mixture and maintained in said mixture until cooled.

An important object of my invention, therefore, is to provide a means of orienting the molecules of glass while still in its liquid state.

Another object of the invention is to provide vibratory power of a suitable frequency, whereby a certain stirring and mixing action may be obtained in the making of glass, thereby assuring a uniform glass.

Further objects and advantages of the invention will be apparent during the course of the following description.

In the accompanying drawing, forming a part of this specification, and in which like numerals are employed to designate similar parts throughout the same:

Figure 1 is a perspective of a ladle pouring molten glass on a plate, while

Figure 1:
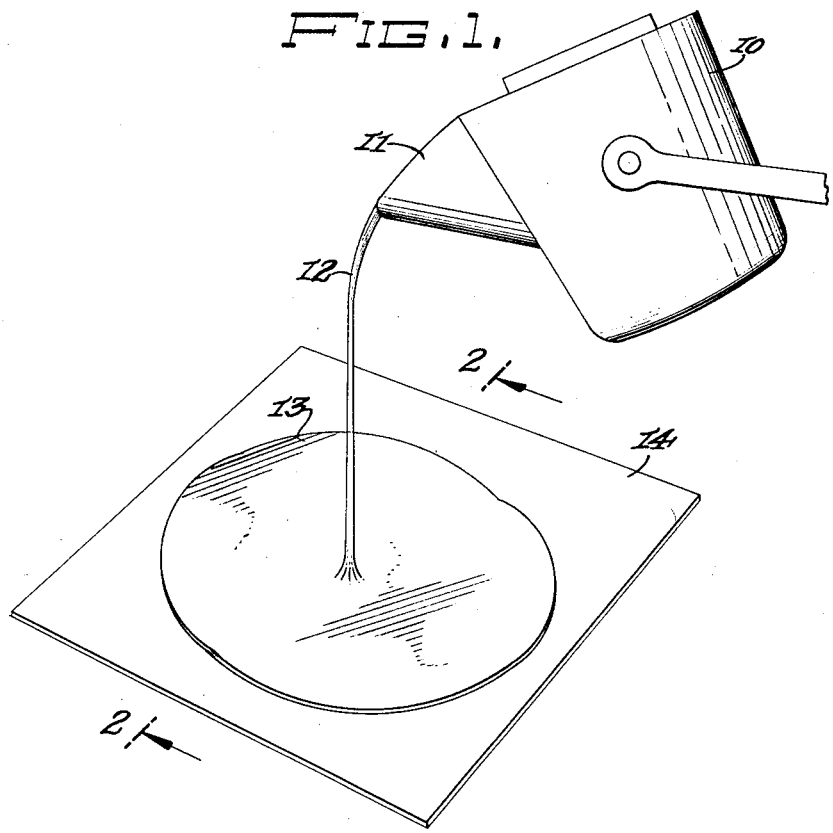

In the drawing, wherein for the purpose of illustration, is shown a preferred embodiment of my invention, the numeral 10 designates the ladle, in which the batch of molten glass is prepared. The ladle 10 has a spout 11 from which a stream of molten glass 12 is poured out forming a flat cake 13 on the plate 14. In the making of plate glass, the plate 14 is usually supplied with an edge so that it can be poured full and act as a form for the molten glass.

Figure 2:
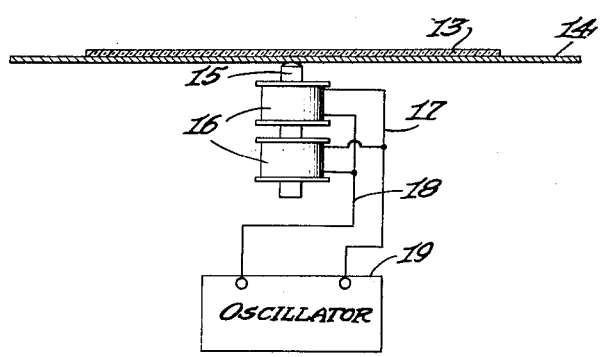
Figure 2 is a section along line 2—2 in Figure 1.

In Figure 2 is illustrated a section taken along line 2—2 in Figure 1. The molten glass 13 is shown as a flat pad on top of the plate 14 under which is placed the vibrating rod or vibration exciter 15, which again is operated by the coils 16. The coils 16 are supplied with vibratory energy through the wires 17 and 18 from the oscillator 19. It is obvious that the vibration exciter 15 may be placed in any convenient position, either at the center of the plate 14, or in any other suitable location.

The operation of my invention is best described as follows: The molten glass 12 in Figure 1 is poured on to plate 14 where it will immediately form a flat cake of a thickness depending upon the quantity poured and the size of the plate. It is obvious, of course, that the glass will begin to cool considerably during the pouring and also due to the contact with the plate, which of necessity must be of a somewhat lower temperature. To counteract the resulting formation of strains, I apply a suitable amount of vibratory power generated in the oscillator 19 and fed into the plate 14 by means of coils 16 and rod 15. It must be understood that the vibration exciter 15, with coils 16, may take on different shapes and forms according to the amount of power to be transmitted and the size of the plate, etc. Depending upon the frequency required, I may then utilize various kinds of oscillators and various kinds of vibration exciters, such as magnetic coils, piezoelectric crystals or magnetostriction rods, etc., such as shown in United States Patent No. 2,105,479. In the present application a magnetostriction type of vibration exciter has been illustrated in an effort to give a simple illustration of an apparatus embodying my invention.

After having thus previously established the most desirable frequency and the necessary amount of vibratory power, as well as the most suitable apparatus for transmitting this power from the oscillator to the plate, the plate 14 is kept in constant vibration during the pouring of the glass, as well as during the cooling of the same. In certain cases it may also be necessary to anneal the glass, and the plate 14 is then placed in an annealing furnace with the vibration exciter 15 attached to the plate so that it can be kept in constant or intermittent vibration, as may be necessary, during the process of annealing. I have also found that, whenever possible, the natural or resonant frequency of the vibratory system should be used as described in the above mentioned application, because this will give better efficiency for the use of the vibratory power.

It is to be understood that the form of my invention shown and described herein, is to be taken as a preferred example of the same and that various changes in the shape, size, and arrangement of parts may well be resorted to, without departing from the spirit of my invention, or the scope of the subjoined claims.

Having thus described my invention I claim:

1. An apparatus for treating glass, comprising a plate for supporting molten glass, means for applying supersonic vibrations to a bottom point of said plate, and means for pouring a stream of molten glass upon said plate at a point directly above said bottom point.

2. An apparatus for treating glass, comprising a plate for supporting molten glass, means for applying supersonic vibrations to a bottom point of said plate, and means for pouring a stream of molten glass upon said plate at a point directly above said bottom point, said means for vibrating including a vibrating rod touching said bottom point.

3. An apparatus for treating glass, comprising a plate for supporting molten glass, means for applying supersonic vibrations to a bottom point of said plate, and means for pouring a stream of molten glass upon said plate at a point directly above said bottom point, said means for vibrating including a vibrating rod touching said bottom point, said vibrating rod being substantially vertical.

4. An apparatus for treating glass, comprising a plate for supporting molten glass, means for applying supersonic vibrations to a bottom point of said plate, and means for pouring a stream of molten glass upon said plate at a point directly above said bottom point, said means for vibrating including a vibrating rod touching said bottom point, said vibrating rod being substantially vertical, and said plate being substantially horizontal.

ALFRED VANG.